(12) United States Patent
Bhattad et al.

(10) Patent No.: US 10,484,147 B2
(45) Date of Patent: Nov. 19, 2019

(54) TECHNIQUES FOR ENHANCED MACHINE TYPE COMMUNICATION ACKNOWLEDGMENT BUNDLING

(71) Applicant: QUALCOMM Incorporated, San Diego, CA (US)

(72) Inventors: Kapil Bhattad, Bangalore (IN); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/886,244

(22) Filed: Feb. 1, 2018

(65) Prior Publication Data

US 2018/0227088 A1    Aug. 9, 2018

(51) Int. Cl.
*H04L 1/18* (2006.01)
*H04L 5/00* (2006.01)
*H04L 5/16* (2006.01)
*H04L 1/16* (2006.01)
*H04W 72/04* (2009.01)

(52) U.S. Cl.
CPC .......... *H04L 1/1861* (2013.01); *H04L 1/1621* (2013.01); *H04L 1/1635* (2013.01); *H04L 1/1819* (2013.01); *H04L 1/1854* (2013.01); *H04L 1/1858* (2013.01); *H04L 1/1864* (2013.01); *H04L 1/1896* (2013.01);
(Continued)

(58) Field of Classification Search
CPC ... H04L 1/1861; H04L 1/1896; H04L 1/1621; H04L 1/1819; H04L 1/1858; H04L 5/0091; H04L 5/0055; H04L 5/16; H04W 72/0446
See application file for complete search history.

(56) References Cited

U.S. PATENT DOCUMENTS

2009/0241004 A1* 9/2009 Ahn ............... H04L 1/1812
714/749
2015/0237619 A1 8/2015 Yang et al.
(Continued)

FOREIGN PATENT DOCUMENTS

WO   WO-2016154840 A1   10/2016

OTHER PUBLICATIONS

International Search Report and Written Opinion—PCT/US2018/016607—ISA/EPO—dated May 4, 2018.

*Primary Examiner* — Joshua Kading
(74) *Attorney, Agent, or Firm* — Patterson & Sheridan, LLP

(57) ABSTRACT

Techniques and apparatus for hybrid automatic retransmission request (HARQ) acknowledgement (ACK) bundling in half duplex frequency division duplexing (HD-FDD) systems are provided. One technique includes determining ACK parameter(s) to be used for acknowledging a bundled transmission that includes instance(s) of a channel across subframe(s). An indication of the ACK parameter(s) is signaled to a user equipment (UE). The ACK parameter(s) include a first ACK parameter that conveys a size of the bundled transmission and a second ACK parameter that conveys an amount of time for the UE to delay acknowledging a data transmission in an instance of the channel after receiving the data transmission. The UE may acknowledge the bundled transmission in accordance with the ACK parameter(s).

30 Claims, 10 Drawing Sheets

(52) U.S. Cl.
CPC .......... *H04L 5/0055* (2013.01); *H04L 5/0091* (2013.01); *H04L 5/16* (2013.01); *H04W 72/0446* (2013.01)

(56) References Cited

U.S. PATENT DOCUMENTS

| | | | |
|---|---|---|---|
| 2016/0143017 A1* | 5/2016 | Yang | H04L 1/1812 370/329 |
| 2018/0027547 A1 | 1/2018 | Lyu et al. | |
| 2018/0092130 A1* | 3/2018 | Yang | H04W 4/70 |
| 2018/0098239 A1* | 4/2018 | You | H04W 28/0215 |

* cited by examiner

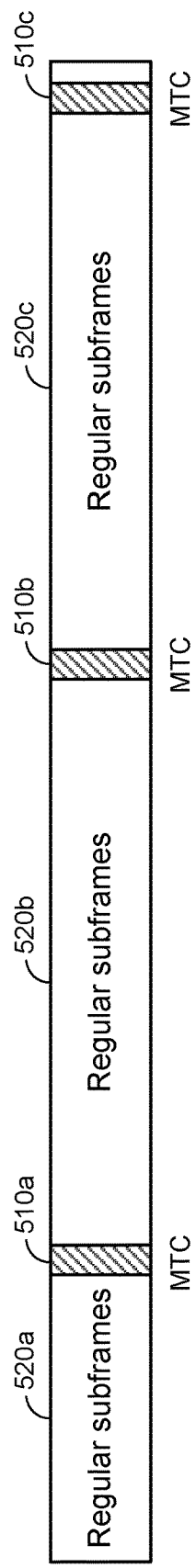
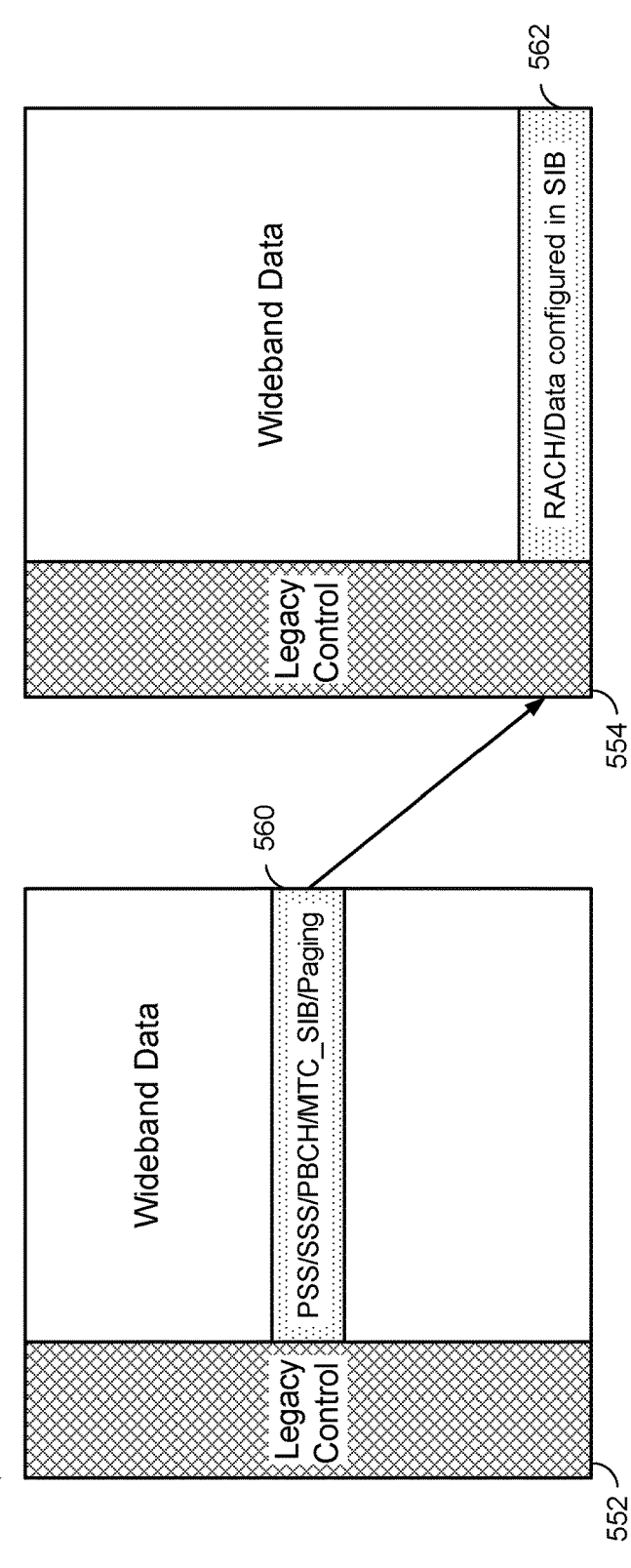
FIG. 5A
FIG. 5B

TECHNIQUES FOR ENHANCED MACHINE TYPE COMMUNICATION ACKNOWLEDGMENT BUNDLING

CROSS-REFERENCE TO RELATED APPLICATION & PRIORITY CLAIM

This application claims the benefit of and priority to Indian Provisional Patent Application Serial No. 201741004051, filed Feb. 3, 2017, which is assigned to the assignee hereof and hereby expressly incorporated by reference herein as if fully set forth below and for all applicable purposes.

TECHNICAL FIELD

Certain aspects of the present disclosure generally relate to wireless communications, and more particularly, to techniques for enabling hybrid automatic retransmission request (HARQ) acknowledgment (ACK) bundling in communication systems, such as enhanced machine type communication (eMTC), that support half duplex (HD) operation (e.g., HD Frequency Division Duplexing (HD-FDD)).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by Third Generation Partnership Project (3GPP).

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Machine type communications (MTC) may refer to communication involving at least one remote device on at least one end of the communication and may include forms of data communication that involve one or more entities that do not necessarily need human interaction. MTC UEs may include UEs that are capable of MTC communications with MTC servers and/or other MTC devices through Public Land Mobile Networks (PLMN), for example. In general, MTC devices may include a broad class of devices in wireless communications including, but not limited to: Internet of Things (IoT) devices, Internet of Everything (IoE) devices, wearable devices and low cost devices.

To enhance coverage of certain devices, such as MTC devices, "bundling" may be utilized in which certain transmissions are sent as a bundle of transmissions, for example, with the same information transmitted over multiple subframes.

Multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as supporting beamforming, multiple-input multiple-output (MIMO) antenna technology, and carrier aggregation. However, as the demand for mobile broadband access continues to increase, there exists a need for further improvements in LTE, NR, and 5G technologies. Preferably, these improvements should be applicable to other multi-access technologies and the telecommunication standards that employ these technologies.

BRIEF SUMMARY OF SOME EXAMPLES

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure provide a method for wireless communications that may be performed, for example, by a base station (BS). The method generally includes determining one or more acknowledgment (ACK) parameters to be used for acknowledging a transmission that includes one or more instances of a channel across one or more subframes. The method also includes signaling an indication of the one or more ACK parameters to a user equipment (UE). The one or more ACK parameters include a first ACK parameter that conveys a size of the transmission and a second ACK parameter that conveys an amount of time for the UE to delay acknowledging a data transmission in an instance of the channel after receiving the data transmission.

Certain aspects of the present disclosure provide an apparatus for wireless communication. The apparatus generally includes means for determining one or more acknowledgment (ACK) parameters to be used for acknowledging a transmission that includes one or more instances of a channel across one or more subframes. The apparatus also includes means for signaling an indication of the one or more ACK parameters to a user equipment (UE). The one or more ACK parameters include a first ACK parameter that conveys a size of the transmission and a second ACK parameter that conveys an amount of time for the UE to delay acknowledging a data transmission in an instance of the channel after receiving the data transmission.

Certain aspects of the present disclosure provide an apparatus for wireless communication. The apparatus generally includes at least one processor and a memory coupled to the at least one processor. The at least one processor is configured to determine one or more acknowledgment (ACK) parameters to be used for acknowledging a transmission that includes one or more instances of a channel across one or more subframes. The at least one processor is also configured to signal an indication of the one or more ACK parameters to a user equipment (UE). The one or more ACK parameters include a first ACK parameter that conveys a size of the transmission and a second ACK parameter that conveys an amount of time for the UE to delay acknowledging a data transmission in an instance of the channel after receiving the data transmission.

Certain aspects of the present disclosure provide a computer-readable medium having computer executable code stored thereon for wireless communication by an apparatus. The computer executable code generally includes code for determining one or more acknowledgment (ACK) parameters to be used for acknowledging a transmission that includes one or more instances of a channel across one or more subframes. The computer executable code also includes code for signaling an indication of the one or more ACK parameters to a user equipment (UE). The one or more ACK parameters include a first ACK parameter that conveys a size of the transmission and a second ACK parameter that conveys an amount of time for the UE to delay acknowledging a data transmission in an instance of the channel after receiving the data transmission.

Certain aspects of the present disclosure provide a method for wireless communications that may be performed, for example, by a user equipment (UE). The method generally includes receiving an indication of one or more acknowledgement (ACK) parameters to use for acknowledging a transmission that includes one or more instances of a channel across one or more subframes. The one or more ACK parameters include a first ACK parameter that conveys a size of the transmission and a second ACK parameter that conveys an amount of time for the UE to delay acknowledging a data transmission in an instance of the channel after receiving the data transmission. The method also includes acknowledging the transmission in accordance with the one or more ACK parameters.

Certain aspects of the present disclosure provide an apparatus for wireless communication. The apparatus generally includes means for receiving an indication of one or more acknowledgement (ACK) parameters to use for acknowledging a transmission that includes one or more instances of a channel across one or more subframes. The one or more ACK parameters include a first ACK parameter that conveys a size of the transmission and a second ACK parameter that conveys an amount of time for the apparatus to delay acknowledging a data transmission in an instance of the channel after receiving the data transmission. The apparatus also includes means for acknowledging the transmission in accordance with the one or more ACK parameters.

Certain aspects of the present disclosure provide an apparatus for wireless communication. The apparatus generally includes at least one processor and a memory coupled to the at least one processor. The at least one processor is configured to receive an indication of one or more acknowledgement (ACK) parameters to use for acknowledging a transmission that includes one or more instances of a channel across one or more subframes. The one or more ACK parameters include a first ACK parameter that conveys a size of the transmission and a second ACK parameter that conveys an amount of time for the apparatus to delay acknowledging a data transmission in an instance of the channel after receiving the data transmission. The at least one processor is also configured to acknowledge the transmission in accordance with the one or more ACK parameters.

Certain aspects of the present disclosure provide a computer-readable medium having computer executable code stored thereon for wireless communication by an apparatus. The computer executable code generally includes code for receiving an indication of one or more acknowledgement (ACK) parameters to use for acknowledging a transmission that includes one or more instances of a channel across one or more subframes. The one or more ACK parameters include a first ACK parameter that conveys a size of the transmission and a second ACK parameter that conveys an amount of time for the apparatus to delay acknowledging a data transmission in an instance of the channel after receiving the data transmission. The computer executable code also includes code for acknowledging the transmission in accordance with the one or more ACK parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

FIGS. 5A and 5B illustrate an example of MTC co-existence within a wideband system, such as LTE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
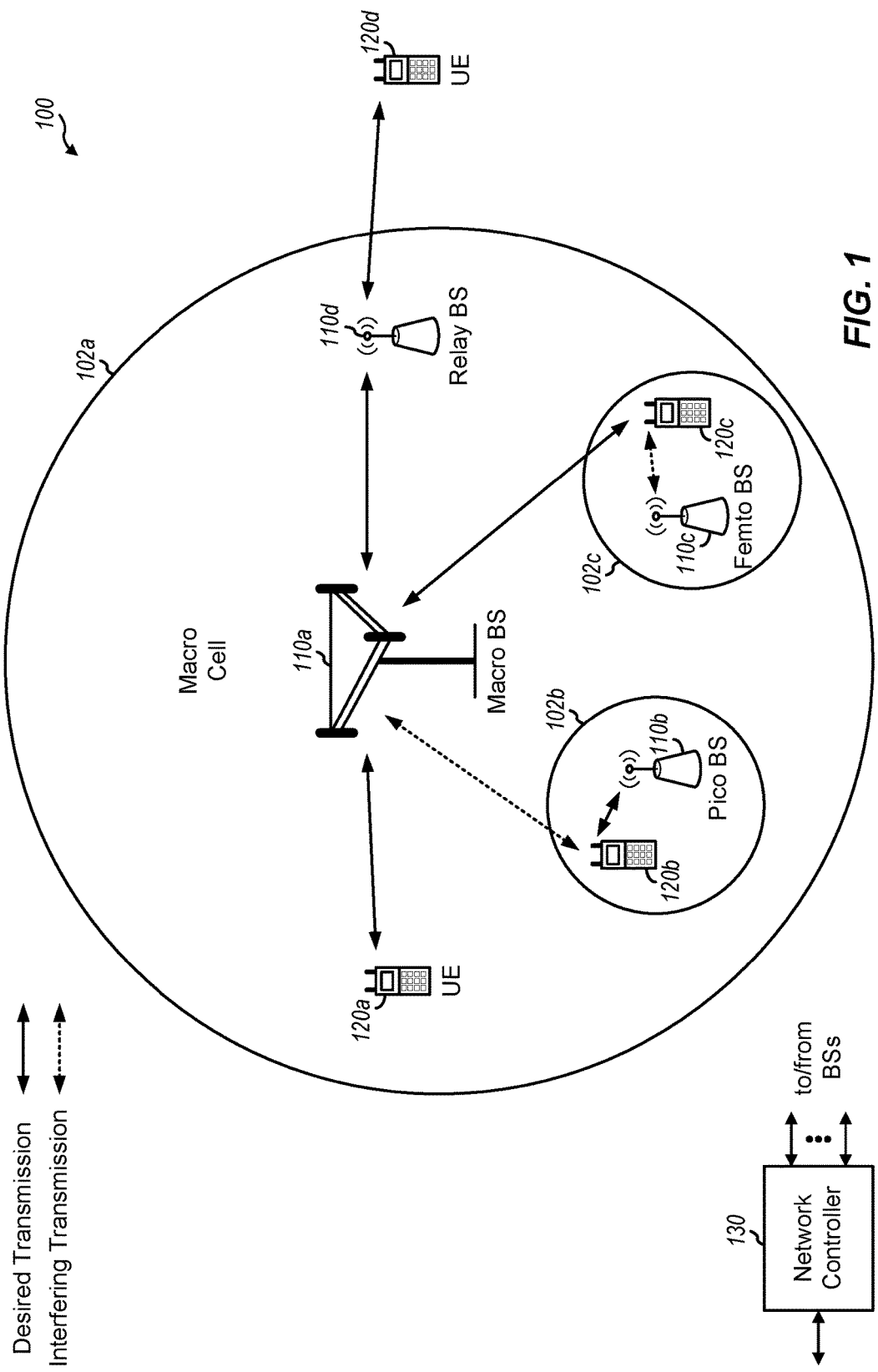
FIG. 1 is a block diagram conceptually illustrating an example of a wireless communication network, in accordance with certain aspects of the present disclosure.

Aspects of the present disclosure provide techniques and apparatus for enabling hybrid automatic retransmission request (HARQ) acknowledgement (ACK) bundling in communication systems that support half duplex frequency division duplexing (HD-FDD), e.g., such as systems that support eMTC.

Some systems (e.g., eMTC) may include UEs (e.g., eMTC UEs) that are bandwidth reduced low complexity (BL) or coverage enhancement (CE) devices. Compared to non BL/CE devices, BL/CE devices may have one or more reduced capabilities, examples of which may include, but are not limited to, a reduction in maximum bandwidth, reduction of peak data rate, reduction of transmit power, HD operation, etc. Due in part to such limited capabilities, these devices may operate in one or more CE modes, where each mode may support one or more different levels of coverage enhancement. In order to achieve coverage enhancement, multiple repetitions/instances (e.g., bundling) of a same message (e.g., channel) may be transmitted over one or more subframes. Bundling, however, can affect the timing across subframes, which in turn can impact communications (e.g., reduce the peak data rate) for eMTC UEs. Accordingly, it may be desirable to provide an efficient HARQ ACK bundling design to maximize the data throughput for eMTC UEs.

Aspects presented herein provide HARQ ACK bundling techniques that can significantly improve the peak data rate (e.g., DL throughput) for UEs (e.g., such as eMTC UEs) by enabling devices to dynamically adjust the timeline relationship between bundled transmissions and HARQ feedback associated with the bundled transmissions. For example, a BS may determine one or more ACK parameters to be used (e.g., by a UE) for acknowledging a bundled transmission. The determination of the ACK parameter(s) may be based on one or more criteria, such as a type/capability of the UE (e.g., whether the UE is a eMTC UE), a CE mode, CE range/level, etc. The bundled transmission may include one or more instances of a channel (e.g., physical downlink shared channel (PDSCH), machine type communication physical downlink control channel (MPDCCH), etc.) across one or more subframes. The ACK parameters may include at least one of a delay parameter, bundle size parameter (e.g., number of instances of the channel in the bundled transmission), whether the channel is transmitted in a last instance of the instances of the channel, downlink assignment counter (DAD, etc.

Once the ACK parameter(s) are determined, the BS may signal the one or more ACK parameters to a UE. The ACK parameter(s) can be used for acknowledging a bundled transmission from the BS or from another BS. Once the UE receives a bundled transmission, the UE may acknowledge the bundled transmission in accordance with the ACK parameters. In one aspect, for example, the UE may determine the ACK parameters for each instance of the channel in the bundled transmission such that the UE transmits an ACK (for all the instances) in the same uplink subframe. The ACK parameter(s) can maximize the peak data rate for the UE by enabling the UE to provide HARQ-ACK feedback (for a bundled transmission across multiple subframes) in a single uplink subframe.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspect. Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs or evolved MTC (eMTC) devices. MTC and eMTC UEs include, for example, robots, drones, remote devices, sensors, meters, monitors, location tags, etc., that may communicate with a BS, another device (e.g., remote device), or some other entity. MTC devices and/or eMTC devices, as well as other types of devices, may include Internet of Everything (IoE) or Internet of Things (IoT) devices, such as NB-IoT devices, and techniques disclosed herein may be applied to MTC devices, eMTC devices, NB-IoT devices, as well as other devices.

It is noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

An Example Wireless Communication System

FIG. 1 is a diagram illustrating a wireless network 100 in which aspects of the present disclosure may be practiced. In aspects, as opposed to sending HARQ feedback separately for each transmission, techniques presented herein can enable a UE to provide HARQ feedback for a bundled transmission (e.g., a transmission of one or more instances of a channel across one or more subframes), which in turn can maximize the peak data for UEs. For example, the BS 110 may determine one or more ACK parameters to be used by UE 120 for acknowledging a bundled transmission from the BS 110 or another BS 110, and signal the ACK parameters to the UE 120. The UE 120, in turn, may acknowledge a bundled transmission received from the BS 110 (or another BS 110) in accordance with the ACK parameters. Doing so in this manner can maximize the DL throughput for UE(s) 120 (e.g., by allowing for additional subframes within a radio frame for downlink data).

The wireless network 100 may be an LTE network or some other wireless network, such as a NR or 5G network, and/or may support NB-IoT, MTC, eMTC, etc. Wireless network 100 may include a number of BSs 110 and other network entities. A BS is an entity that communicates with user equipments (UEs) and may also be referred to as a base station, eNB, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, an BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile base station. In some examples, the base stations may be interconnected to one another and/or to one or more other base stations or network nodes (not shown) in the access network 100 through various types of backhaul interfaces such as a direct physical connection, a virtual network, or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation (e.g., HD-FDD), etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Rel-12) may also be able to monitor downlink (DL) control channels in the same away as legacy and/or advanced UEs in the LTE network monitor DL control channels. Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

Narrowband UEs may be limited to a particular narrowband assignment, for example, of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 20 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

While aspects of the examples described herein may be associated with LTE technologies, aspects of the present disclosure may be applicable with other wireless communications systems, such as NR. NR may support various wireless communication services, such as millimeter wave (mmW) targeting high carrier frequency (e.g., 60 GHz), massive multiple input multiple output (MIMO), sub-6 GHz systems, etc. NR may utilize OFDM with a CP on the uplink and downlink and include support for half-duplex operation using TDD. A single component carrier bandwidth of 100 MHZ may be supported. NR resource blocks may span 12 sub-carriers with a subcarrier bandwidth of 75 kHz over a 0.1 ms duration. Each radio frame may consist of 2 half frames, each half frame consisting of 5 subframes with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR (in one reference example) are described in more detail below with respect to FIGS. 8 and 9. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
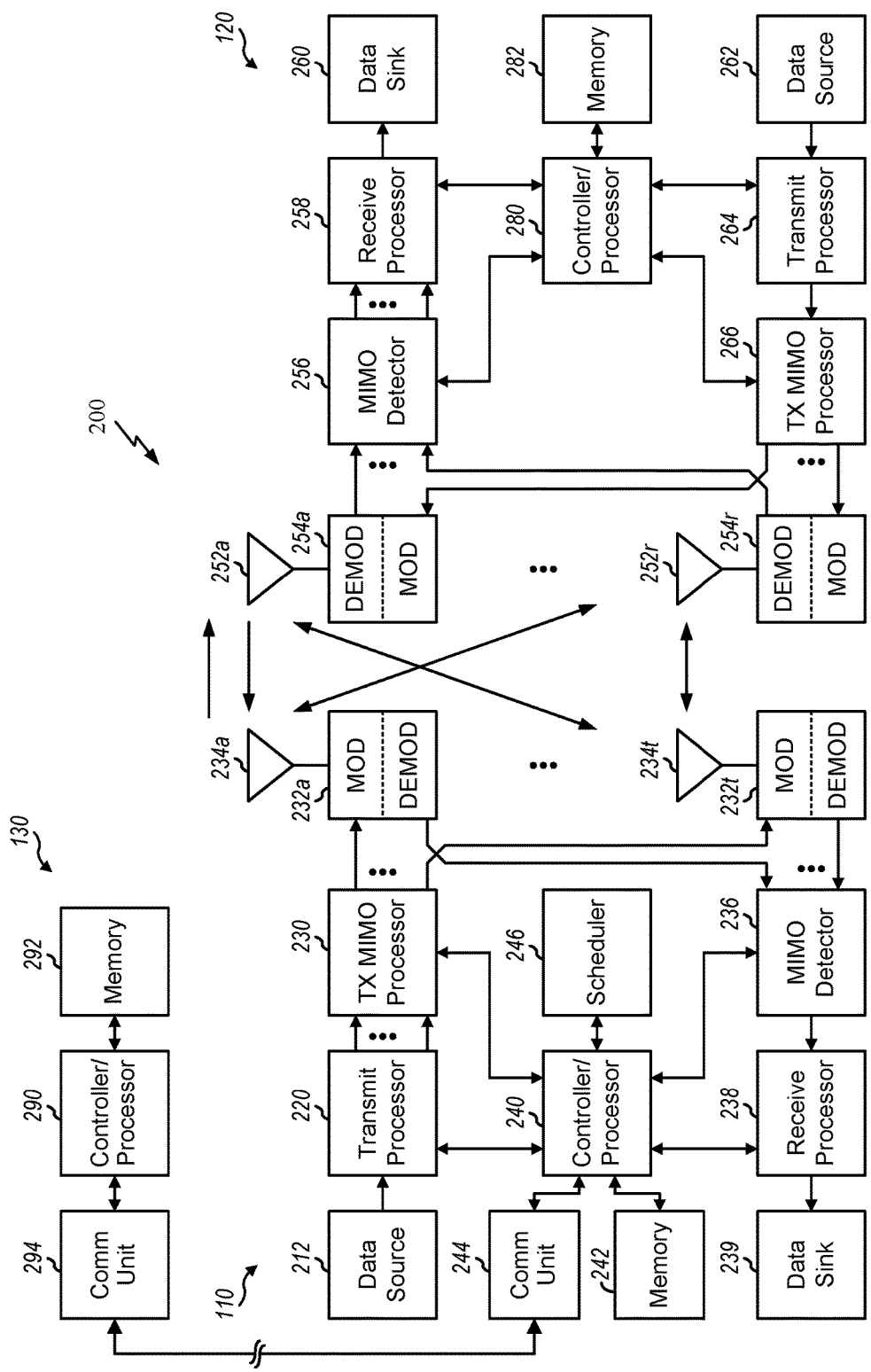
FIG. 2 shows a block diagram conceptually illustrating an example of a base station in communication with a user equipment (UE) in a wireless communications network, in accordance with certain aspects of the present disclosure.

FIG. 2 shows a block diagram of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1. One or more components of the BS 110 and UE 120 may be used to practice aspects of the present disclosure.

At BS 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at BS 110 and UE 120, respectively, to perform techniques presented herein for enabling HARQ-ACK bundling in HD-FDD (e.g., for eMTC UEs). For example, controller/processor 280 and/or other controllers/processors and modules at UE 120 may perform or direct operations by the UE in FIG. 11, and/or other processes for the techniques described herein. By enabling controller/processor 280 and/or other modules at the UE 120 to perform operations in FIG. 11 (e.g., for providing HARQ-ACK feedback for a bundled transmission), the controller/processor 280 can significantly increase the peak data rate for UE 120 (relative to conventional HARQ ACK feedback techniques). The controller/processor 240 and/or other controllers/processors and modules at BS 110 may perform operations by the BS in FIG. 10 and/or other processes for the techniques described herein. By enabling controller/processor 240 and/or other modules at BS 110 to perform operations in FIG. 10 (e.g., for determining ACK parameters for a UE to use for providing HARQ-ACK feedback for a bundled transmission), the controller/processor 240 can significantly increase the peak data rate for UE 120 (relative to conventional HARQ ACK feedback techniques). Memories 242 and 282 may store data and program codes for base station 110 and UE 120, respectively. A scheduler 246 may schedule UEs for data transmission on the downlink and/or uplink.

Figure 3:
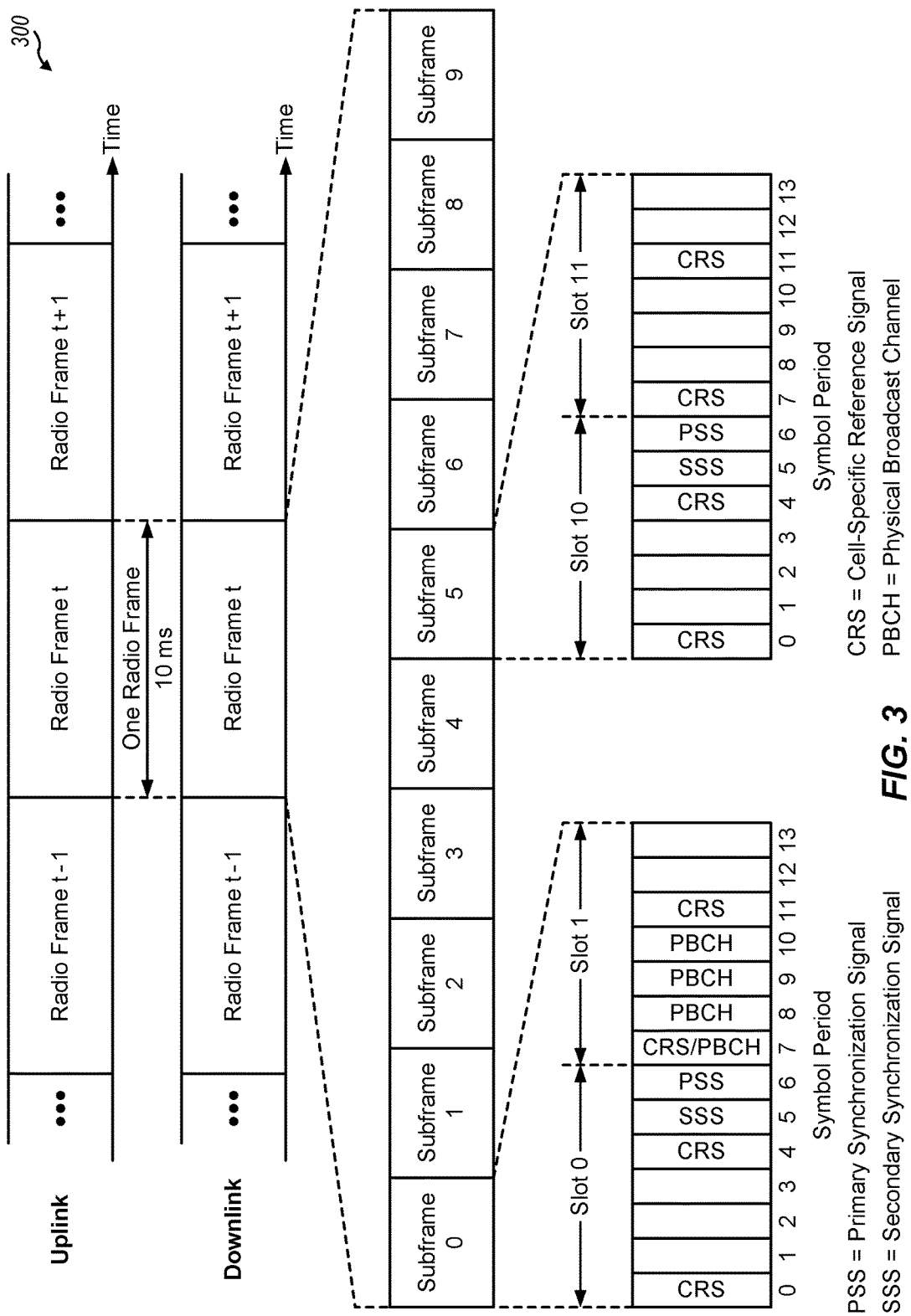
FIG. 3 is a block diagram conceptually illustrating an example of a frame structure in a wireless communications network, in accordance with certain aspects of the present disclosure.

FIG. 3 shows an exemplary frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

Figure 4:
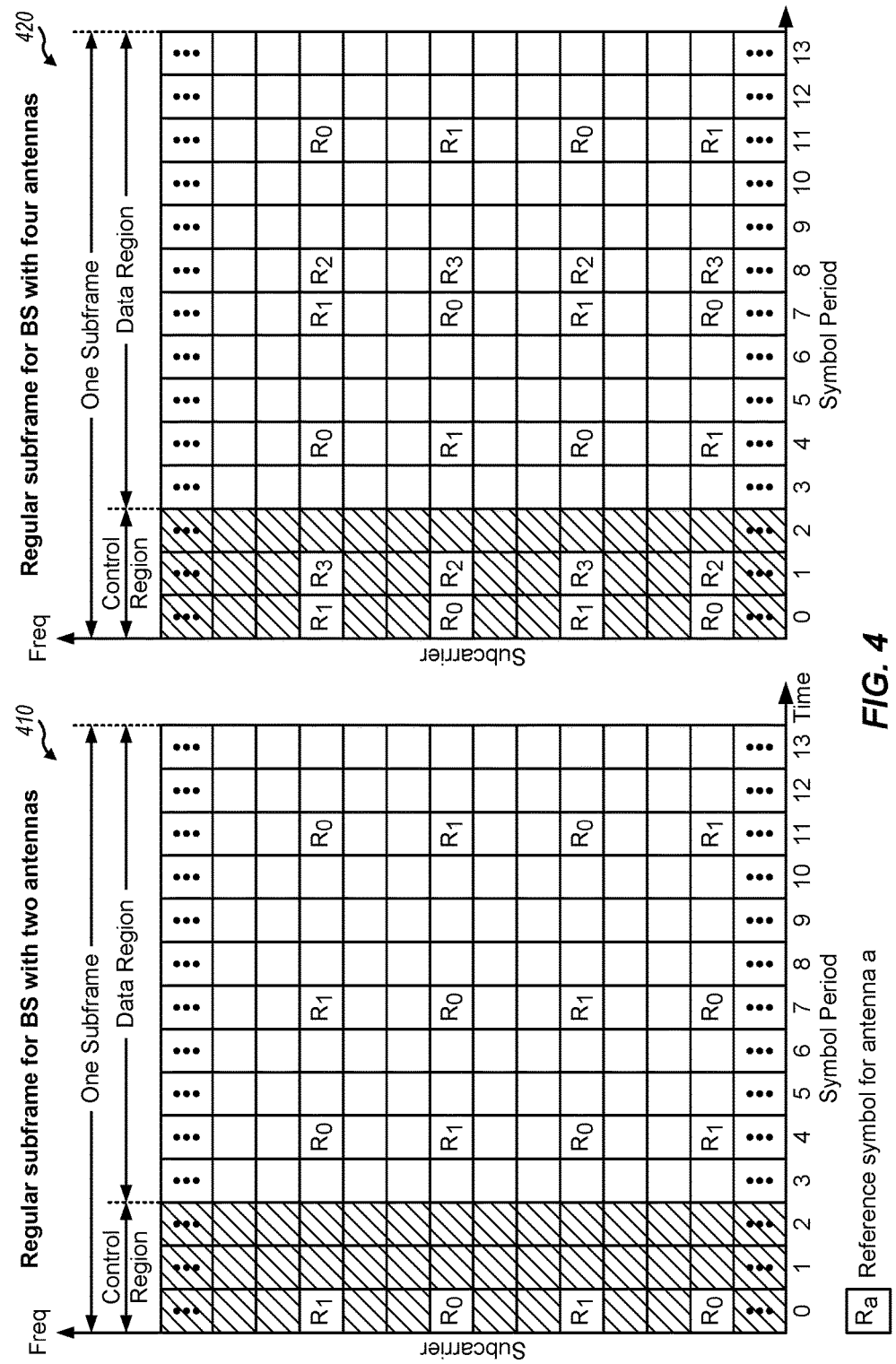
FIG. 4 is a block diagram conceptually illustrating exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

Example Narrowband Communications

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (e.g., relative to wideband UEs), a single receive radio frequency (RF) chain may be used, peak rate may be reduced (e.g., a maximum of 1000 bits for a transport block size), transmit power may be reduced, Rank 1 transmission may be used, and half duplex operation may be performed.

FIGS. 5A and 5B illustrate examples of how UEs in MTC and/or eMTC operation may co-exist within a wideband system (e.g., 1.4/3/5/10/15/20 MHz), such as LTE. As illustrated in the example frame structure of FIG. 5A, subframes

510 associated with MTC and/or eMTC operation may be time division multiplexed (TDM) with regular subframes 520 associated with LTE (or some other RAT).

As mentioned above, MTC and/or eMTC operation may be supported in the wireless communication network (e.g., in coexistence with LTE or some other RAT). That is, eMTC may co-exist with other LTE services within the same bandwidth, support FDD, TDD and half duplex (HD) modes, re-use existing LTE base stations with software update (e.g., according to E-UTRAN vendors), etc. FIGS. 5A and 5B, for example, illustrate an example of how UEs in MTC and/or eMTC operation may co-exist within a wideband system (e.g., 1.4/3/5/10/15/20 MHz), such as LTE.

As illustrated in the example frame structure of FIG. 5A, subframes 510 associated with MTC and/or eMTC operation may be time division multiplexed (TDM) with regular subframes 520 associated with LTE (or some other RAT). Additionally or alternatively, as illustrated in the example frame structure of FIG. 5B, one or more narrowband regions 560, 562 used by narrowband UEs may be frequency division multiplexed within the wider bandwidth 550 supported by LTE. Multiple narrowband regions, with each narrowband region spanning a bandwidth that is no greater than a total of 6 RBs, may be supported for MTC and/or eMTC operation. In some cases, such as LTE Release 13, each eMTC UE may operate (e.g., monitor/receive/transmit) within one narrowband region (e.g., at 1.4 MHz or 6 RBs) at a time. In other cases, such as LTE Release 14, eMTC UEs may operate on a 5 MHz narrowband region (e.g., using 25 RBs).

At any given time, eMTC UEs may re-tune to other narrowband regions in the wider system bandwidth. That is, an eMTC UE may switch or hop between multiple narrowband regions in order to reduce interference. In some examples, multiple eMTC UEs may be served by the same narrowband region. In yet other examples, different combinations of eMTC UEs may be served by one or more same narrowband regions and/or one or more different narrowband regions.

As shown, the eMTC UEs may operate (e.g., monitor/receive/transmit) within the narrowband regions for various different operations. For example, as shown in FIG. 5B, a first narrowband region 560 of a subframe 552 may be monitored by one or more eMTC UEs for either a PSS, SSS, PBCH, MTC signaling, or paging transmission from a BS in the wireless communication network. As also shown in FIG. 5B, a second narrowband region 562 of a subframe 554 may be used by eMTC UEs to transmit a RACH or data previously configured in signaling received from a BS. In some cases, the second narrowband region may be utilized by the same UEs that utilized the first narrowband region (e.g., the UEs may have re-tuned to the second narrowband region to transmit after monitoring in the first narrowband region). In some cases (although not shown), the second narrowband region may be utilized by different UEs than the UEs that utilized the first narrowband region.

Certain systems may provide eMTC UEs with coverage enhancements of up to 20 dB to support low cost MTC devices (e.g., such as BL/CE users) with a single antenna and a basic receiver, and/or located in cell edges to connect. That is, eMTC UEs and eNB may perform measurements at low SNRs (e.g., −15 dB to −20 dB). In order to achieve coverage enhancement, multiple repetitions/instances (e.g., bundling) of the same message (with different redundancy versions) may be transmitted over one or more subframes.

Although the examples described herein assume a narrowband of 6 RBs, those skilled in the art will recognize that the techniques presented herein may also be applied to different sizes of narrowband regions (e.g., 25 RBs).

In the case of NB-IoT, the wireless communication network (e.g., LTE Release 13, or greater) may support deployments using one physical resource block (PRB) (e.g., 180 kHz+20 kHz guard band). NB-IoT deployments may utilize higher layer components of LTE and hardware to allow for reduced fragmentation and cross compatibility with, for example, NB-LTE and eMTC. In one case, NB-IoT may be deployed in-band and coexist with legacy GSM/WCDMA/LTE system(s) deployed in the same frequency band. Wideband LTE channel, for example, may be deployed in various bandwidths between 1.4 MHz to 20 MHz, and there may be a dedicated PRB for use by NB-IoT, or the RBs allocated for NB-IoT may be dynamically allocated (e.g., by an eNB). In an in-band deployment, one PRB, or 180 kHz, of a wideband LTE channel may be used for NB-IoT. In some deployments, NB-IoT may be deployed standalone. In a standalone deployment, one 180 kHz carrier may be used to carry NB-IoT traffic and GSM spectrum may be reused. In some deployments, NB-IoT may be deployed in the unused resource blocks within a LTE carrier guard-band.

NB-IoT may support single-tone and multi-tone assignments. For example, in uplink, 15 kHz or 3.75 kHz tone spacing may be used with single tone allocation or multiple tone allocation. For 15 kHz tone or subcarrier spacing, up to 12 tones or subcarriers can be used in a resource unit with single tone allocation and for 3.75 kHz tone spacing up to 48 tones can be used in a resource unit with single tone allocation.

Example NR/5G RAN Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, mission critical targeting ultra reliable low latency communications (URLLC) service, etc.

In NR, the RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases, DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 6:
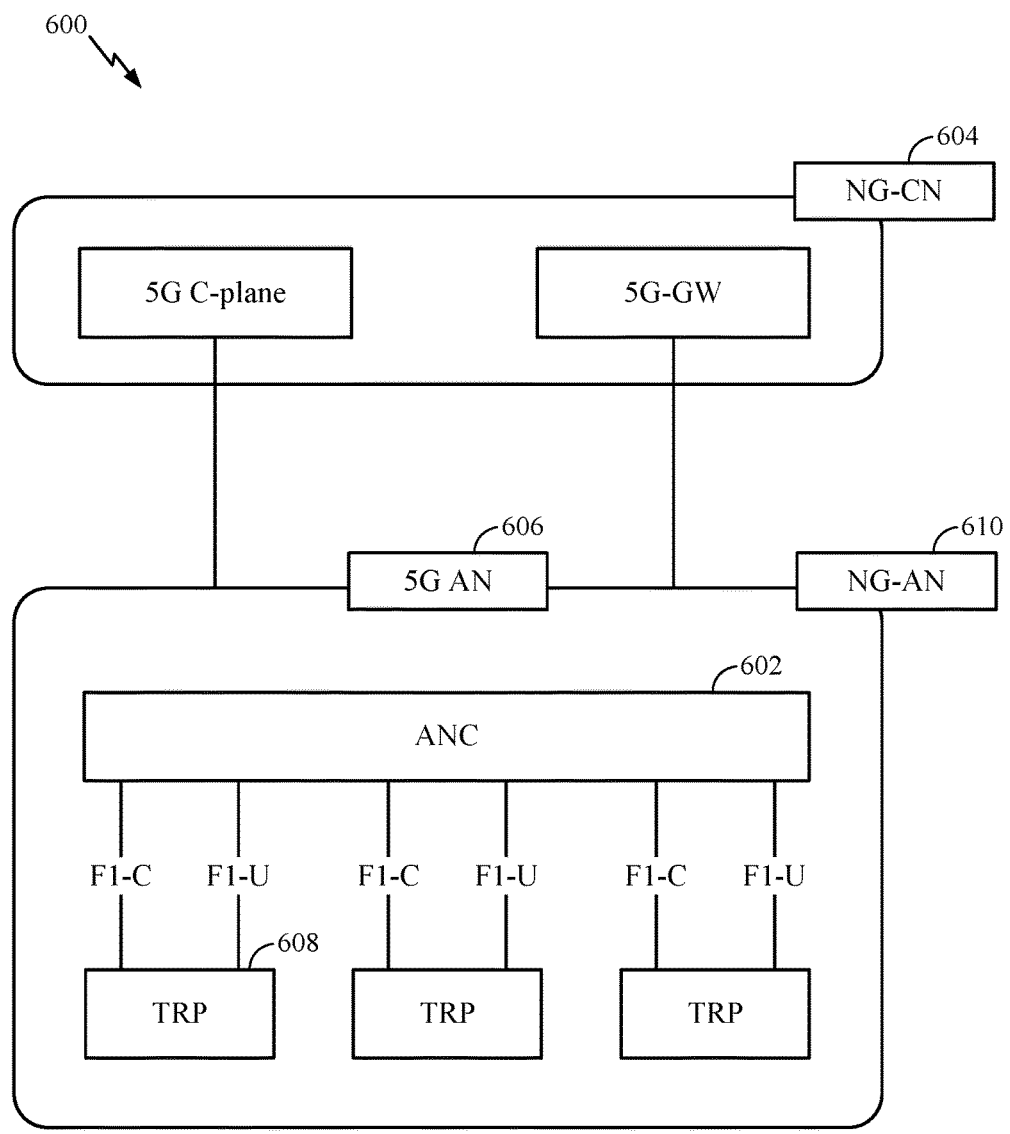
FIG. 6 illustrates an example logical architecture of a distributed radio access network (RAN), in accordance with certain aspects of the present disclosure.

FIG. 6 illustrates an example logical architecture of a distributed RAN 600, according to aspects of the present disclosure. A 5G access node 606 may include an access node controller (ANC) 602. The ANC may be a central unit (CU) of the distributed RAN 600. The backhaul interface to the next generation core network (NG-CN) 604 may terminate at the ANC. The backhaul interface to neighboring next generation access nodes (NG-ANs) may terminate at the ANC. The ANC may include one or more TRPs 608 (which may also be referred to as BSs, NR BSs, Node Bs, 5G NBs, APs, gNB, or some other term). As described above, a TRP may be used interchangeably with "cell."

The TRPs 608 may be a distributed unit (DU). The TRPs may be connected to one ANC (ANC 602) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 600 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 610 may support dual connectivity with NR. The NG-AN may share a common fronthaul for LTE and NR.

The architecture may enable cooperation between and among TRPs 608. For example, cooperation may be preset within a TRP and/or across TRPs via the ANC 602. According to aspects, no inter-TRP interface may be needed/present.

According to aspects, a dynamic configuration of split logical functions may be present within the architecture 600. The PDCP, RLC, MAC protocol may be adaptably placed at the ANC or TRP.

According to certain aspects, a BS may include a central unit (CU) (e.g., ANC 602) and/or one or more distributed units (e.g., one or more TRPs 608).

Figure 7:
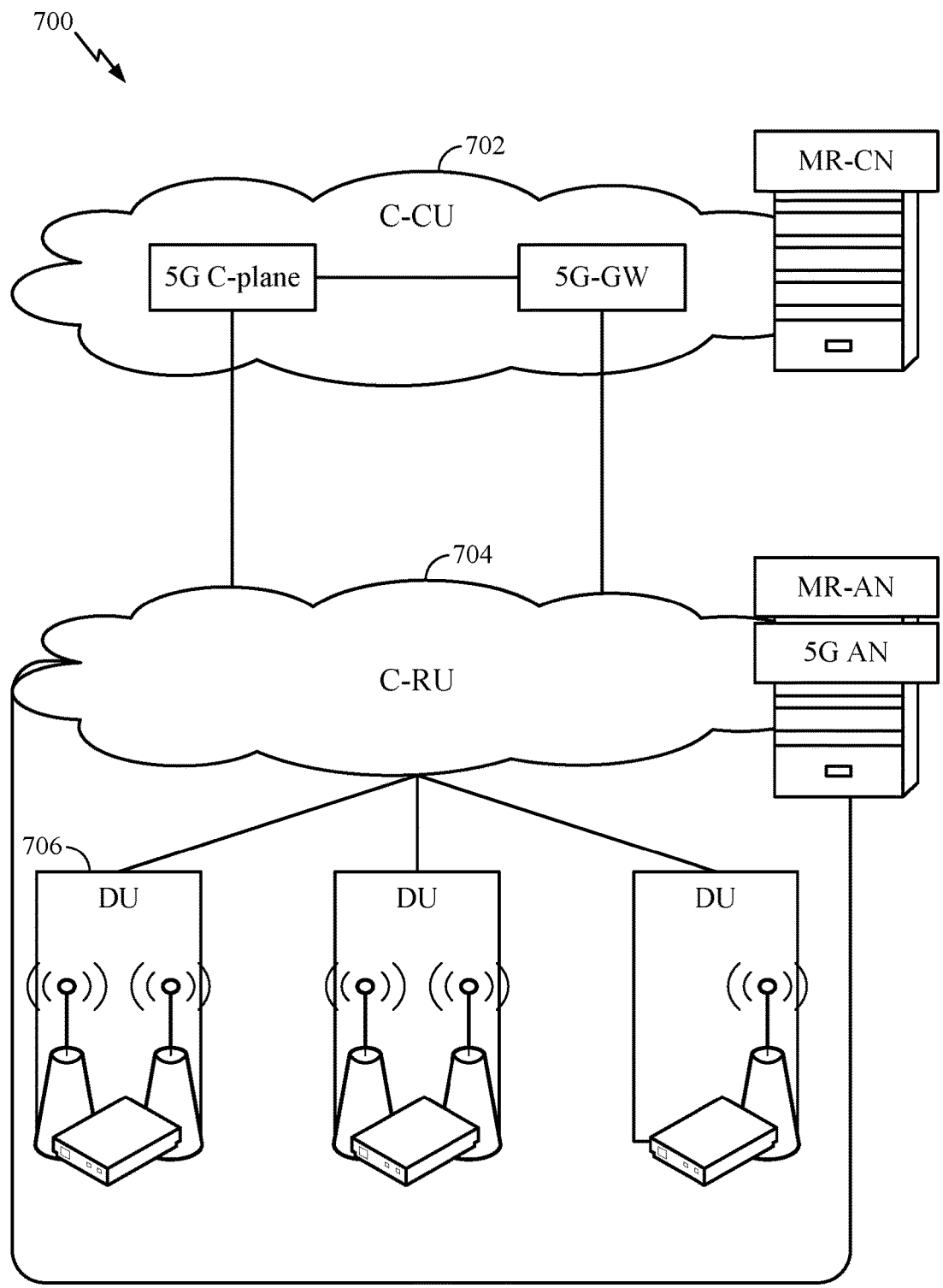
FIG. 7 illustrates an example physical architecture of a distributed RAN, in accordance with certain aspects of the present disclosure.

FIG. 7 illustrates an example physical architecture of a distributed RAN 700, according to aspects of the present disclosure. A centralized core network unit (C-CU) 702 may host core network functions. The C-CU may be centrally deployed. C-CU functionality may be offloaded (e.g., to advanced wireless services (AWS)), in an effort to handle peak capacity.

A centralized RAN unit (C-RU) 704 may host one or more ANC functions. Optionally, the C-RU may host core network functions locally. The C-RU may have distributed deployment. The C-RU may be closer to the network edge.

A distributed unit (DU) 706 may host one or more TRPs. The DU may be located at edges of the network with radio frequency (RF) functionality.

Figure 8:
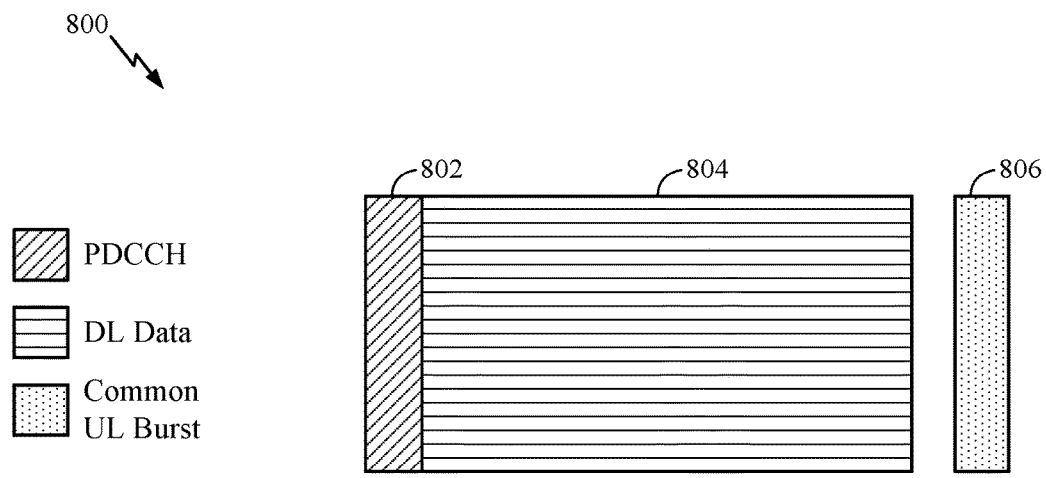
FIG. 8 is a diagram illustrating an example of a downlink (DL)-centric subframe, in accordance with certain aspects of the present disclosure.

FIG. 8 is a diagram 800 showing an example of a DL-centric subframe. The DL-centric subframe may include a control portion 802. The control portion 802 may exist in the initial or beginning portion of the DL-centric subframe. The control portion 802 may include various scheduling information and/or control information corresponding to various portions of the DL-centric subframe. In some configurations, the control portion 802 may be a physical DL control channel (PDCCH), as indicated in FIG. 8. The DL-centric subframe may also include a DL data portion 804. The DL data portion 804 may sometimes be referred to as the payload of the DL-centric subframe. The DL data portion 804 may include the communication resources utilized to communicate DL data from the scheduling entity (e.g., UE or BS) to the subordinate entity (e.g., UE). In some configurations, the DL data portion 804 may be a physical DL shared channel (PDSCH).

The DL-centric subframe may also include a common UL portion 806. The common UL portion 806 may sometimes be referred to as an UL burst, a common UL burst, and/or various other suitable terms. The common UL portion 806 may include feedback information corresponding to various other portions of the DL-centric subframe. For example, the common UL portion 806 may include feedback information corresponding to the control portion 802. Non-limiting examples of feedback information may include an ACK signal, a NACK signal, a HARQ indicator, and/or various other suitable types of information. The common UL portion 806 may include additional or alternative information, such as information pertaining to random access channel (RACH) procedures, scheduling requests (SRs), and various other suitable types of information. As illustrated in FIG. 8, the end of the DL data portion 804 may be separated in time from the beginning of the common UL portion 806. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 9:
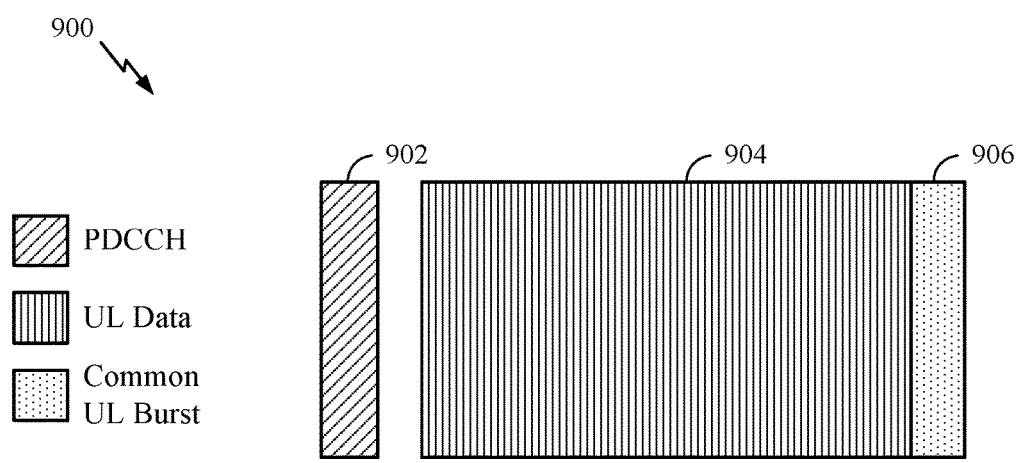
FIG. 9 is a diagram illustrating an example of an uplink (UL)-centric subframe, in accordance with certain aspects of the present disclosure.

FIG. 9 is a diagram 900 showing an example of an UL-centric subframe.

The UL-centric subframe may include a control portion 902. The control portion 902 may exist in the initial or beginning portion of the UL-centric subframe. The control portion 902 in FIG. 9 may be similar to the control portion 802 described above with reference to FIG. 8. The UL-centric subframe may also include an UL data portion 904. The UL data portion 904 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 902 may be a physical DL control channel (PDCCH).

As illustrated in FIG. 9, the end of the control portion 902 may be separated in time from the beginning of the UL data portion 904. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 906. The common UL portion 906 in FIG. 9 may be similar to the common UL portion 806 described above with reference to FIG. 8. The common UL portion 906 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

Example Methods and Apparatus for Enabling Support of HARQ-ACK Bundling in Hd-FDD for eMTC Some of the focus of further enhancements for eMTC has been on the support of positioning, multicast, mobility enhancements and higher data rates. In some cases, however, it can be difficult to achieve higher data rates for certain UEs (e.g., HD-FDD UEs), due in part, to current HARQ feedback techniques. For example, in eMTC, the peak data rate of a HD-FDD UE may be affected by the timeline relationships and HD guard subframe. With current HARQ feedback techniques, however, the UE typically sends HARQ feedback (for multiple transmissions) across multiple subframes. Thus, it may be difficult to maximize the peak data rate for such UEs, since the number of available downlink subframes may be limited. As a reference example, the maximum data rate for a HD-FDD UE may be 300 kbps, as a single radio frame may include three PDSCH subframes, three PUCCH subframes, two HD guard subframes and two non-PDSCH subframes due to cross-subframes scheduling.

To support higher data rates, aspects presented herein provide techniques and apparatus for enabling HARQ-ACK bundling in HD-FDD for communication systems such as eMTC. HARQ-ACK bundling may be supported in at least one of CE Mode A in HD-FDD, CE Mode B, CE Mode A in FD-FDD, physical uplink control channel (PUCCH) repetition case, PDSCH repetition case, machine type communication physical downlink control channel (MPDCCH) repetition case, etc.

In general, one or more HARQ-ACK bundles may be supported for PDSCH scheduling before switching to UL. The HARQ-ACK bundle size may be defined as the number of PDSCH transmissions (corresponding to different HARQ processes) with a joint HARQ-ACK feedback. In some cases, the maximum HARQ-ACK bundle size may be four. There may be one or more HARQ-ACK bundles before a UE switches to UL.

By using the HARQ-ACK bundling techniques described herein, the system can increase DL throughput for half duplex operation. For example, in the above described case where the maximum data rate was limited to 300 kbps, the data rate may be increased to 500 kbps (from 300 kpbs) if the HARQ-ACK for the PDSCH can be multiplexed in a single subframe (e.g., instead of three subframes). Note, however, that this is just one example of how the techniques described herein can further increase DL throughput for UEs, and that, in some cases, aspects presented herein may allow for a peak data rate greater than 500 kbps.

Figure 10:
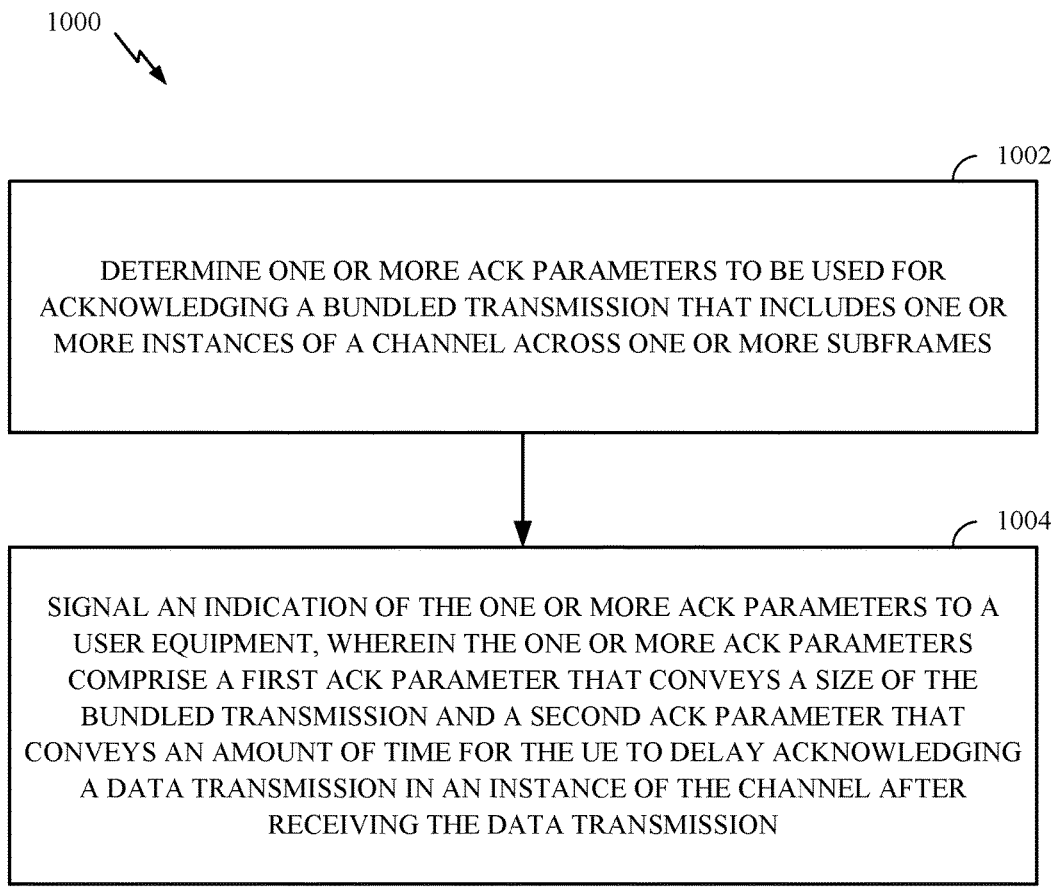
FIG. 10 is a flow diagram illustrating operations performed by a BS, in accordance with certain aspects of the present disclosure.

FIG. 10 is a flow diagram illustrating example operations 1000 for wireless communications, in accordance with certain aspects of the present disclosure. The operations 1000 may be performed, for example, by a base station (e.g., eNB 110).

The operations 1000 begin, at 1002, where the BS determines one or more ACK parameters to be used for acknowledging a bundled transmission that includes one or more instances of a channel across one or more subframes. The channel can be a data channel (e.g., PDSCH), control channel (e.g., MPDCCH), etc. The transmission may be from the BS and/or from another BS.

At 1004, the BS signals an indication of the one or more ACK parameters to a UE (e.g., a eMTC UE such as UE 120). The one or more ACK parameters may include a first ACK parameter that conveys a size of the bundled transmission and a second ACK parameter that conveys an amount of time for the UE to delay acknowledging a data transmission in an instance of the channel after receiving the data transmission.

Figure 11:
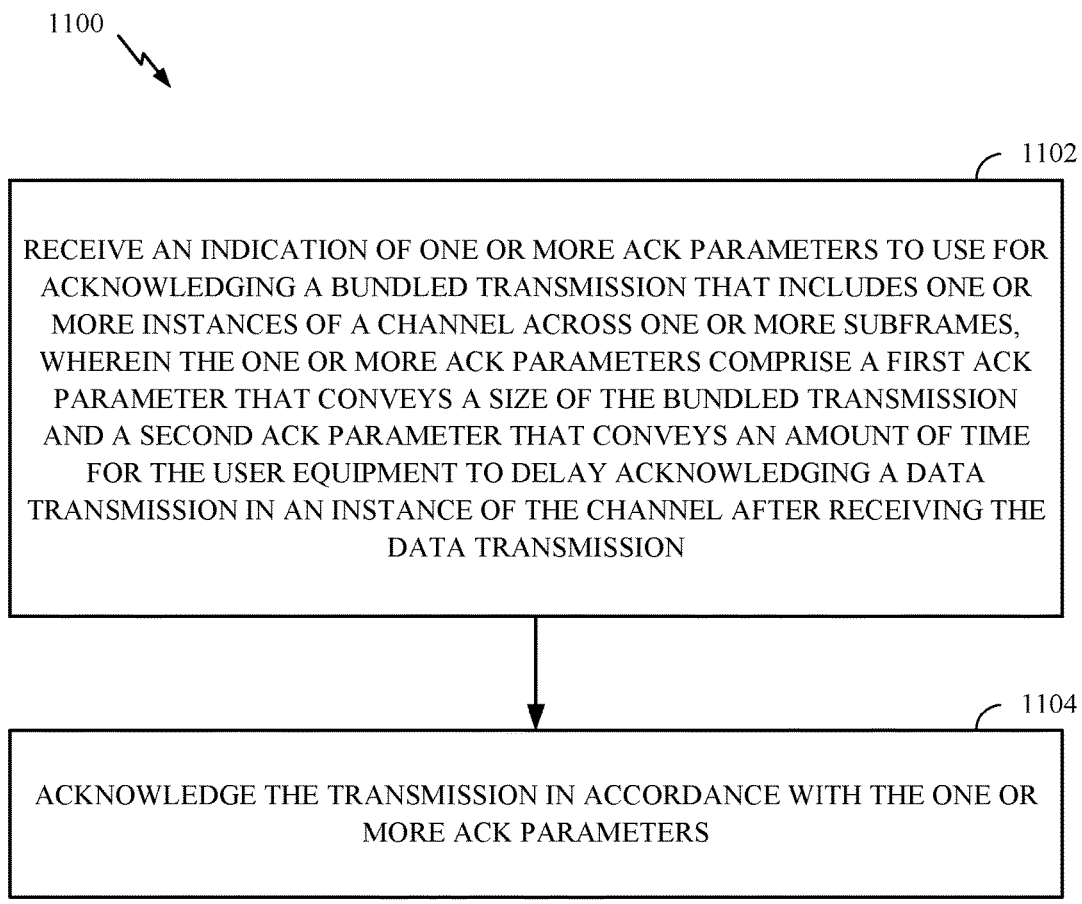
FIG. 11 is a flow diagram illustrating operations performed by a UE, in accordance with certain aspects of the present disclosure.

FIG. 11 is a flow diagram illustrating example operations 1100 for wireless communications, in accordance with certain aspects of the present disclosure. The operations 1100 may be performed, for example, by a UE (e.g., eMTC UE, such as UE 120).

The operations 1100 begin, at 1102, where the UE receives an indication of one or more ACK parameters to use for acknowledging a bundled transmission that includes one or more instances of a channel across one or more subframes. The channel can be a data channel (e.g., PDSCH), control channel (e.g., MPDCCH), etc. The one or more ACK parameters may include a first ACK parameter that conveys a size of the bundled transmission and a second ACK parameter that conveys an amount of time for the UE to delay acknowledging a data transmission in an instance of the channel after receiving the data transmission. At 1104, the UE acknowledges the bundled transmission in accordance with the one or more ACK parameters.

In some aspects, the BS may determine the ACK parameters based in part on a type and/or capability of the UE. For example, in some cases, the BS may determine a first set ACK parameters (to enable HARQ ACK bundling) for BL/CE devices, and may determine a second set of ACK parameters for non-HARQ ACK bundling for non-BL/CE devices. In some cases, the BS may determine to enable HARQ ACK bundling for BL/CE devices operating in HD-FDD and that support at least one of HARQ ACK bundling or dynamic ACK timing. In some aspects, the ACK parameters may be determined based on the CE mode(s) supported by the UE. For example, the BS may determine ACK parameters to enable HARQ ACK bundling for UEs that support CE mode A, and determine ACK parameters for non-HARQ ACK bundling for UEs that support CE mode B.

In some aspects, the BS may select/determine the ACK parameters from a predetermined number of candidate values. For example, as described below, in some cases, the first ACK parameter may signal a size between 1 and 4, and the second ACK parameter may signal a delay value in one or more different ranges of values.

The UE may signal one or more parameters indicating the UE's capability to support at least one of BL/CE operation, HD-FDD operation, CE mode(s), CE levels, HARQ-ACK bundling, dynamic ACK timing, etc. If the UE is capable of supporting bundling and/or dynamic ACK timing (e.g., to delay transmission of an ACK), the BS may configure the UE to support bundling and/or dynamic ACK timing via radio resource control (RRC) signaling.

In one aspect, the BS and/or UE may determine the ACK parameters for each instance of a control channel (e.g., MPDCCH) associated with each instance of the data channel (e.g., PDSCH) in the bundled transmission, such that an ACK (for a group of instances) is sent in the associated uplink subframe by the UE. In one aspect, the ACK parameters may include at least one delay value parameter (e.g., second ACK parameter) that conveys an amount of time for the UE to delay acknowledging a data transmission in an instance of the data channel after receiving the data transmission.

Assuming, for example, that the bundled transmission includes an instance of a data channel (e.g., PDSCH) transmitted on each of three subframes (subframes 1, 2, and 3), the BS can signal in the control channel (e.g., MPDCCH) associated with each data channel instance the delay (e.g., number of subframes) the UE should wait before sending an ACK. That is, each delay parameter can signal the number of subframes between the end of the data channel and the start of ACK/NACK. For example, assuming the BS wants the UE to send an ACK on subframe 7 that acknowledges the bundled data transmission (e.g., from subframes 1-3), the delay parameter for subframe 1 may indicate a delay of 6 subframes, the delay parameter for subframe 2 may indicate a delay of 5 subframes, and the delay parameter for subframe 3 may indicate a delay of 4 subframes. In this manner, the BS can determine delay parameters for each instance in the bundled transmission, such that the UE sends an ACK in a single uplink subframe. When the BS signals the delay, the UE may implicitly determine the bundle group by identifying the potential uplink subframe and determine how many MPDCCH/PDSCH were received that requested ACK/NACK to be sent on that subframe.

In some aspects, an ACK delay indicator field (that indicates the delay "D") can be added to the downlink control information (DCI) (e.g., in MPDCCH) to enable ACK bundling. In some cases, the ACK delay indicator field can indicate a full set of delay values. For example, the ACK delay indicator field may use three bits to indicate at least one of delays in the set D={4,5,6,7,8,9,10,11}. Upon receiving the delay indicator, the UE may transmit an ACK corresponding to the PDSCH ending on subframe X at subframe X+D. However, in some cases, the UE may transmit ACK on subframe X+D only if, in subframe X+D, the UE detected all N MPDCCHs in the bundle and decoded the corresponding PDSCHs. That is, the UE may transmit NACK if it fails to detect at least one corresponding MPDCCH and/or PDSCH.

In some cases, the ACK delay indicator field (e.g., three bit field or other amount of bits) can indicate a subsampled set of delay values. In some cases, the ACK delay indicator field can indicate a subsampled set of delay values that specifies the minimum delay the UE should use after receiving a data transmission. For example, the ACK delay indicator field may use two bits to indicate at least one of the minimum delays in the set D={4, 6, 8, 10}. In these cases, upon receiving the delay indicator, the UE may try a hypothesis of X+D, X+D+1 for the ACK subframe for PDSCH ending at subframe X. The UE may determine, based on the number of MPDCCH it has detected in each subframe, which of the subframes is the correct subframe to send the ACK. For example, the UE may count the number of MPDCCH/PDSCH it detects corresponding to subframes X+D, X+D+1, and choose the smaller of the two subframes that matches the number of PDSCH in the bundle criteria.

While using a two bit ACK delay indicator field may save a bit (e.g., compared to using a three bit ACK delay indicator field), in some cases, the two bit ACK delay indicator field may affect the scheduling decisions at the eNB. For example, if the UE determines that the number of detected MPDCCHs do not match (e.g., is not N), the UE may transmit NACK on these subframes if the UE is able to reliably determine the subframe. The UE may puncture the ACK/NACK otherwise.

In some aspects, the one or more ACK parameters may include a parameter (e.g., first ACK parameter) that conveys the size of the bundled transmission. For example, the size of the bundled transmission may correspond to the number of the instances of the channel associated with the bundled transmission. In one aspect, (e.g., when bundling is configured by RRC), a field that indicates the number of PDSCH in the bundle can be added to DCI (in the downlink grant) to enable ACK bundling. For example, in one case, the field can indicate the number N of PDSCH in the bundle, where N is selected from {1,2,3,4}.

In one aspect, the ACK parameters may include a parameter that conveys the size of the bundled transmission and a parameter that indicates whether the channel has been transmitted in a last instance of the one or more instances in the bundled transmission (e.g., "last instance in bundle" indication). For example, in one implementation, the BS may jointly code the number N of PDSCH in the bundle with a "last instance in bundle" bit. In some cases, the UE may just have to know the size of the bundle in situations where the UE receives the last instance in the bundle, as such information may be sufficient for the UE to determine if it received all PDSCH in the bundle. Therefore, in some cases, the BS may set the parameter that conveys the size of the bundled transmission to zero or other dummy values such as max allowed bundle size if the channel has not been transmitted in the last instance of the instances in the bundled transmission (i.e., the "last instance in bundle" bit is 0). On the other hand, the BS may set the parameter that conveys the size of the bundled transmission to the correct size of the bundled transmission if the channel has been transmitted in the last instance of the instances in the bundled transmission.

As one reference example of jointly coding the number N of PDSCH in the bundle with the "last instance in bundle" bit, if bundle sizes of 1, 2, 4 are supported, the BS may signal one of the following four states to the UE: (1) '00': not last instance; (2) '01': last instance, 1 instance in bundle; (3) '10': last instance, 2 instances in bundle; (4) '11': last instance, 4 instances in bundle. Those of ordinary skill in the art, however, will recognize that other values may be used for different bundle sizes. In some cases, the BS may use three bits to support all bundle sizes from 1 to 4. In general, the BS may use any number of bits to support different bundle sizes.

In some aspects, the ACK parameters may include a parameter that conveys the size of the bundled transmission and a parameter that conveys a value of a downlink assignment index (DAI) for the bundled transmission. For example, the BS can signal the DAI counter in addition to the "las instance in bundle" bit by jointly coding the two.

Such information may give the UE more visibility regarding which PDSCH was potentially lost.

In some aspects, as opposed to transmitting a "last instance in bundle bit," the size of the bundled transmission (indicated for a given instance of the channel) may implicitly indicate whether the channel has been transmitted in a last instance of the one or more instances in the bundled transmission. For example, for each instance of the channel prior to a last instance of the channel, the BS may set the size of the bundled transmission (for that instance) to a value that is greater than a number of that instance in the one or more instances of the channel. Assume, for example, that the bundled transmission includes four instances of a data channel across four subframes. In this example, the BS may set the size of the bundled transmission for the first instance to a value greater than "1", set the size of the bundled transmission for the second instance to a value greater than "2", and set the size of the bundled transmission for the third instance to a value greater than "3". In some aspects, the BS may set the size of the bundled transmission for each instance (prior to the last instance) to a maximum number of allowed instances of the one or more instances of the channel with uplink ACK on the same uplink subframe. Continuing with the above example, the BS in this case may set the size of the bundled transmission for each of the first three subframes to "4".

In this manner, the BS can implicitly indicate to the UE whether the channel has been transmitted in the last instance of the bundled transmission. For example, if the UE determines that the indicated bundle size for a given instance does not match (e.g., is greater than) the number of decoded MPDCCH/PDSCH until that instance, the UE may determine that the channel has not been transmitted in the last instance of the bundled transmission.

In some aspects, the BS may set the size of the bundled transmission to a correct size of the bundled transmission if the channel has been transmitted in a last instance of the one or more instances in the bundled transmission. Continuing with the above example, for the last (fourth) instance, the BS may set the size of the bundled transmission to "4" to implicitly indicate that the channel has been transmitted in the last instance.

In general, the ACK parameters may include any one of or combination of the above parameters to enable ACK bundling. For example, in one aspect, the ACK parameters may include the delay parameter D, the number N of PDSCH in the bundle, and/or the "last instance in the bundle" bit. The BS may maintain a table that includes the delay, number of instances in the bundle, and whether the instance is the last instance (e.g., whether the channel has been transmitted in a last instance of the instances of the channel in the bundled transmission). The BS may set the number of instances in the bundle to zero or other values if the instance is not the last instance. For some delays, the UE may assume that an instance is not the last instance. For example, if in subframe X the UE receives an indication that the delay is greater than 7 subframes, the UE may assume that subframe X is not the last instance in the bundle.

In some aspects, the BS may receive a message from the UE after the BS transmits the instances of the channel across the one or more subframes. The BS may determine, based at least in part on a size of the message, whether the bundled transmission was correctly decoded by the UE. For example, in some cases, the message may convey more than one bit of information in the UL subframe. If the message includes a plurality of bits, the BS may determine, from a first one or more bits of the message, a number of the instances of the channel that were received by the UE. In addition, the BS may determine, from a second one or more bits of the message, for a group of instances of the channel, whether the channel in each received instance in the group is acknowledged or negatively acknowledged.

For example, assume that format 2B/channel selection or other methods to convey more than 1 bit of information in the ACK/NACK resource is used. If the message (from the UE) includes four bits, two bits (of the four bits) may be used to indicate the number of instances of the channel received by the UE and the remaining two bits may be used to indicate ACK/NACK for the instances (e.g., first bit for ACK/NACK of PDSCH 1,3 and second bit for ACK/NACK of PDSCH 2,4). If the message includes three bits, two bits may be used to indicate the number of instances of the channel received by the UE, and a single bit for ACK/NACK (e.g., for up to four instances of PDSCH bundled together). If the message includes two bits, the first bit may be used for ACK/NACK of PDSCH 1,3 and the second bit may be used for ACK/NACK of PDSCH 2,4. If the message includes a single bit, the single bit may be used to ACK/NACK up to four PDSCHs bundled together.

In some cases, for the three/four bit options, the BS may not have to send the number of PDSCHs in the bundle indication (e.g., number of subframes/last subframe/DAI, etc.) in the DL DCI. For one bit/two bit cases, the BS may send the number of PDSCHs in the bundle indication in the DL DCI.

In some aspects, when the UE sends an ACK/NACK that corresponds to a group of bundled PDSCHs, the UE may send an ACK if all the PDSCHs in the bundle are decoded successfully, and may send a NACK if at least one of the MPDCCH corresponding to the bundled PDSCHs is an erasure. In this manner, the techniques presented herein may provide an ACK bundling design that is robust to MPDCCH erasures (e.g., when the UE fails to detect/decode a MPDCCH).

In some aspects, the UE may determine the size of the bundled transmission from the ACK parameters communicated in the control region. In some aspects, the UE may determine the size of the bundled transmission from the number of MPDCCH it has detected that point to the same UL subframe for ACK. In some aspects, the UE may send an ACK in the UL subframe if (1) the size (e.g., first size) of the bundled transmission detected from the ACK parameters (in the last received instance of the control channel of the bundled transmission) is equal to the size (e.g., second size) of the bundled transmission detected from the number of MPDCCH that point to the same UL subframe for ACK, and (2) the UE has successfully decoded all the PDSCH associated with that UL subframe. Otherwise, the UE may send a NACK (e.g., if the first size is not equal to the second size or if any instance of the PDSCH associated with the uplink subframe is decoded incorrectly). For example, the UE may send an ACK on a subframe if it detects and decodes K MPDCCH/PDSCHs corresponding to that subframe and K is equal to the ACK parameter "size of the bundled transmission" in the last decoded DL grant (MPDCCH) in the bundle.

The ACK bundling design disclosed herein may improve the scheduling flexibility at the eNB. For example, if the eNB is able to communicate the correct bundling size only in the last instance of the control channel, the eNB can change its decision on the bundling size at any time. For example if the eNB had intended to send a bundle size of 4 and 4 contiguous subframes to a UE, it can set bundle size=4 on all 4 PDCCHs associated with the planned bundle. However, if after transmitting the first PDCCH/PDSCH in the bundle, the eNB decides that it wants to use a bundle size of 2 as it needs other subframes for other higher priority data for other UEs, the eNB can just change the bundle size on next transmission of PDCCH and PDSCH to the UE to two and the system operates as if the eNB intended the bundle size to be two from the beginning. The ACK bundling design disclosed herein may thus not enforce PDSCH transmission on every subframe. In addition, the techniques disclosed herein allow for a scalable, flexible ACK bundling design that can work with repetitions of MPDCCH, PDSCH, PUCCH, etc.

Aspects presented herein also provide techniques for simultaneous reception of multiple UL grants.

Similar to ACK bundling, data rate increases in DL and/or UL may be obtained by allowing grants for multiple PDSCH transmissions to be in the same MPDCCH search space. For half duplex UEs, any subframe used for sending the UL grants in the MPDDCH may reduce the number of available UL subframes. Additionally, since DL uses cross-subframe scheduling, any subframes being used for MPDCCH for sending UL grants may reduce available resources for sending PDSCH and for sending grants for PDSCH, which may be a limiting factor in low SNR due to the use of larger aggregation levels. Thus, by allowing multiple UL grants to be received simultaneously, the eNB can use the extra scheduling flexibility to increase the throughputs in the DL or UL or both.

eMTC operation, in general, may allow multiple UL grants to be received in the same MPDCCH search space. However, since the UL timeline is typically fixed to start at N+4 (for FDD) where N is the last MPDCCH subframe on which the grant was received, this configuration may put constraints on the PUSCH transmission and scheduling of corresponding MPDCCH. For example, with current techniques, it may not be possible to send multiple UL grants on the same DL subframe.

Accordingly, aspects presented herein provide techniques for increasing the flexibility for sending multiple UL grants in one MPDCCH search space. For example, in one aspect, multiple UL grants may be sent using separate MPDCCH, one for each grant without increasing the number of blind decoding at the UE. Additionally, in one aspect, new fields, such as the UL assignment index used in TDD, may be added to the DCI payload to offset the multiple PUSCH transmissions on different set of subframes. Alternatively, in some aspects, a common MPDCCH that provides multiple UL grants can be used.

Advantageously, the techniques presented herein provide a flexible ACK bundling design that can be used to improve DL throughput for half duplex operation.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), detecting, ascertaining, identifying, checking, and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

For example, means for determining, means for performing, means for transmitting, means for receiving, means for sending, means for indicating, means for setting, means for signaling, means for acknowledging, means for configuring, means for bundling, means for decoding, means for selecting, means for conveying, means for identifying, and/or means for decoding may include a processing system, which may include one or more processors or other elements, such as the transmit processor 264, the controller/processor 280, the receive processor 258, and/or antenna(s) 252 of the user equipment 120 illustrated in FIG. 2, and/or the transmit processor 220, the controller/processor 240, the receive processor 238, and/or antenna(s) 234 of the base station 110 illustrated in FIG. 2.

Means for transmitting, means for sending, means for signaling, means for indicating, means for acknowledging, and/or means for conveying may include a transmitter, which may include a transmit processor 264, MOD(s) 254, and/or antenna(s) 252 of the user equipment 120 illustrated in FIG. 2, and/or the transmit processor 220, MOD(s) 232, and/or antenna(s) 234 of the base station 110 illustrated in FIG. 2. Means for receiving may include a receiver, which may include receiver processor 258, DEMOD(s) 254, and/or antenna(s) 252 of the user equipment 120 illustrated in FIG. 2, and/or the receive processor 238, MOD(s) 232, and/or antenna(s) 234 of the base station 110.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a base station (BS), comprising:
    determining a plurality of acknowledgment (ACK) parameters for acknowledging a transmission comprising a plurality of instances of a data channel across a plurality of subframes, wherein the plurality of ACK parameters are determined for each instance of a plurality of instances of a control channel, each instance of the plurality of instances of the control channel being associated with a different instance of the plurality of instances of the data channel in the transmission, such that an ACK for the plurality of instances of the data channel across the plurality of the subframes is sent on a single uplink subframe; and
    signaling an indication of the plurality of ACK parameters determined for each instance of the plurality of instances of the control channel to a user equipment (UE), wherein:
        the plurality of ACK parameters determined for each instance of the plurality of instances of the control channel comprise a first ACK parameter that conveys a size of the transmission and a second ACK parameter that conveys an amount of time for the UE to delay acknowledging a data transmission in the associated instance of the data channel after receiving the data transmission;
        the first ACK parameter of the plurality of ACK parameters for the instance of the control channel associated with a last instance of the data channel in the transmission indicates a correct size of the transmission; and
        the size of the transmission comprises a number of the plurality of instances of the data channel in the transmission.

2. The method of claim 1, wherein the amount of time comprises one or more subframes.

3. The method of claim 1, wherein:
    the data channel comprises a physical downlink shared channel (PDSCH); and
    the control channel comprises a machine type communication physical downlink control channel (MPDCCH).

4. The method of claim 1, wherein the size of the transmission indicates whether the data channel is the last instance of the plurality of instances of the data channel in the transmission.

5. The method of claim 1, wherein, for each instance of the plurality of instances of the data channel prior to the last instance of the plurality of instances of the data channel, the size of the transmission is set to a size greater than a number of that instance in the plurality of instances of the data channel.

6. The method of claim 5, wherein the size greater than the number of that instance is a maximum number of allowed instances of the plurality of instances of the data channel with uplink ACK on a single subframe.

7. A method for wireless communications by a user equipment (UE), comprising:
    receiving an indication of a plurality of acknowledgement (ACK) parameters for acknowledging a transmission comprising a plurality of instances of a data channel across a plurality of subframes; and
    acknowledging the transmission in accordance with the plurality of ACK parameters, wherein:
        the plurality of ACK parameters are indicated for each instance of a plurality of instances of a control channel, each instance of the plurality of instances of the control channel being associated with a different instance of the plurality of instances of the data channel in the transmission, such that acknowledging the transmission comprises sending an ACK or negative ACK (NACK) for the plurality of instances of the data channel received across the plurality of the subframes on a single uplink subframe;
        the plurality of ACK parameters indicated for each instance of the plurality of instances of the control channel comprise a first ACK parameter that conveys a size of the transmission and a second ACK parameter that conveys an amount of time for the UE to delay acknowledging a data transmission in the associated instance of the data channel after receiving the data transmission;
        the first ACK parameter of the plurality of ACK parameters indicated for the instance of the control channel associated with a last instance of the data channel in the transmission indicates a correct size of the transmission; and
        the size of the transmission comprises a number of the plurality of instances of the data channel in the transmission.

8. The method of claim 7, wherein the amount of time comprises one or more subframes.

9. The method of claim 7, wherein:
    the data channel comprises a physical downlink shared channel (PDSCH); and
    the control channel comprises a machine type communication physical downlink control channel (MPDCCH).

10. The method of claim 7, further comprising:
    determining a first size of the transmission based at least in part on the plurality of ACK parameters; and
    determining a second size of the transmission based at least in part on a number of the plurality of instances of the control channel detected that indicate the single uplink subframe.

11. The method of claim 10, wherein the first size of the transmission is determined based on the plurality of ACK parameters in a last received instance of the plurality of instances of the control channel.

12. The method of claim 11, wherein acknowledging the transmission comprises sending the ACK in the single uplink subframe if the first size is equal to the second size and each instance of the plurality of instances of the data channel associated with the single uplink subframe is decoded correctly.

13. The method of claim 11, wherein acknowledging the transmission comprises sending the NACK in the single uplink subframe if the first size is not equal to the second size or if any instance of the plurality of instances of the data channel associated with the single uplink subframe is decoded incorrectly.

14. The method of claim 7, further comprising determining whether an instance of the data channel in the transmission is the last instance of the plurality of instances of the data channel in the transmission based in part on the size of the transmission indicated by the first ACK parameter for the instance of the control channel associated with the instance of the data channel.

15. The method of claim 14, wherein the determination is that the instance of the data channel in the transmission is not the last instance of the plurality of instances of the data channel in the transmission if the size of the transmission indicated by the first ACK parameter for the instance of the control channel associated with the instance of the data channel is set to a size greater than a number of instances of the data channel received by the UE.

16. The method of claim 15, wherein the size greater than the number of instances of the data channel received by the UE is a maximum number of allowed instances of the plurality of instances of the data channel with uplink ACK on a single subframe.

17. The method of claim 14, wherein the determination is that the instance of the data channel in the transmission is the last instance of the plurality of instances of the data channel in the transmission if the size of the transmission indicated by the first ACK parameter for the instance of the control channel associated with the instance of the data channel is equal to a number of instances of the data channel received by the UE.

18. An apparatus for wireless communication, comprising:
at least one processor configured to:
determine a plurality of acknowledgment (ACK) parameters for acknowledging a transmission comprising a plurality of instances of a data channel across a plurality of subframes, wherein the plurality of ACK parameters are determined for each instance of a plurality of instances of a control channel, each instance of the plurality of instances of the control channel being associated with a different instance of the plurality of instances of the data channel in the transmission, such that an ACK for the plurality of instances of the data channel across the plurality of the subframes is sent on a single uplink subframe; and
signal an indication of the plurality of ACK parameters determined for each instance of the plurality of instances of the control channel to a user equipment (UE), wherein:
the plurality of ACK parameters determined for each instance of the plurality of instances of the control channel comprise a first ACK parameter that conveys a size of the transmission and a second ACK parameter that conveys an amount of time for the UE to delay acknowledging a data transmission in the associated instance of the data channel after receiving the data transmission;
the first ACK parameter of the plurality of ACK parameters for the instance of the control channel associated with a last instance of the data channel in the transmission indicates a correct size of the transmission; and
the size of the transmission comprises a number of the plurality of instances of the data channel in the transmission; and
a memory coupled to the at least one processor.

19. The apparatus of claim 18, wherein the amount of time comprises one or more subframes.

20. The apparatus of claim 18, wherein, for each instance of the plurality of instances of the data channel prior to the last instance of the plurality of instances of the data channel, the size of the transmission is set to a size greater than a number of that instance in the plurality of instances of the data channel.

21. The apparatus of claim 20, wherein the size greater than the number of that instance is a maximum number of allowed instances of the plurality of instances of the data channel with uplink ACK on a single subframe.

22. An apparatus for wireless communication, comprising:
at least one processor configured to:
receive an indication of a plurality of acknowledgement (ACK) parameters for acknowledging a transmission comprising a plurality of instances of a data channel across a plurality of subframes; and
acknowledge the transmission in accordance with the plurality of ACK parameters, wherein:
the plurality of ACK parameters are indicated for each instance of a plurality of instances of a control channel, each instance of the plurality of instances of the control channel being associated with a different instance of the plurality of instances of the data channel in the transmission, such that acknowledging the transmission comprises sending an ACK or negative ACK (NACK) for the plurality of instances of the data channel received across the plurality of the subframes on a single uplink subframe;
the plurality of ACK parameters indicated for each instance of the plurality of instances of the control channel comprise a first ACK parameter that conveys a size of the transmission and a second ACK parameter that conveys an amount of time for the apparatus to delay acknowledging a data transmission in the associated instance of the data channel after receiving the data transmission;
the first ACK parameter of the plurality of ACK parameters indicated for the instance of the control channel associated with a last instance of the data channel in the transmission indicates a correct size of the transmission; and
the size of the transmission comprises a number of the plurality of instances of the data channel in the transmission; and
a memory coupled to the at least one processor.

23. The apparatus of claim 22, wherein the amount of time comprises one or more subframes.

24. The apparatus of claim 22, wherein:
the at least one processor is further configured to:
determine a first size of the transmission based at least in part on the plurality of ACK parameters; and
determine a second size of the transmission based at least in part on a number of the plurality of instances of the control channel detected that indicate the single uplink subframe.

25. The apparatus of claim 24, wherein the first size of the transmission is determined based on the plurality of ACK parameters in a last received instance of the plurality of instances of the control channel.

26. The apparatus of claim 25, wherein the at least one processor is configured to acknowledge the transmission by sending the ACK in the single uplink subframe if the first size is equal to the second size and each instance of the plurality of instances of the data channel associated with the single uplink subframe is decoded correctly.

27. The apparatus of claim 25, wherein the at least one processor is configured to acknowledge the transmission by sending the NACK in the single uplink subframe if the first size is not equal to the second size or if any instance of the plurality of instances of the data channel associated with the single uplink subframe is decoded incorrectly.

28. The apparatus of claim 22, wherein the at least one processor is further configured to determine whether an instance of the data channel in the transmission is the last instance of the plurality of instances of the data channel in the transmission based in part on the size of the transmission indicated by the first ACK parameter for the instance of the control channel associated with the instance of the data channel.

29. The apparatus of claim 28, wherein the at least one processor is configured to determine that the instance of the data channel in the transmission is not the last instance of the plurality of instances of the data channel in the transmission if the size of the transmission indicated by the first ACK parameter for the instance of the control channel associated with the instance of the data channel is set to a size greater than a number of instances of the data channel received by the apparatus.

30. The apparatus of claim 29, wherein the size greater than the number of instances of the data channel received by the apparatus is a maximum number of allowed instances of the plurality of instances of the data channel with uplink ACK on a single subframe.

\* \* \* \* \*